United States Patent [19]
Gobeli

[11] Patent Number: 5,418,968
[45] Date of Patent: May 23, 1995

[54] SYSTEM AND METHOD FOR CONTROLLING INTERRUPT PROCESSING

[76] Inventor: Gregg P. Gobeli, 1524 Farigdon Dr., Plano, Tex. 75075

[21] Appl. No.: 8,085

[22] Filed: Jan. 22, 1993

Related U.S. Application Data

[63] Continuation of Ser. No. 608,191, Oct. 31, 1990, abandoned.

[51] Int. Cl.$^6$ ............................................... G06F 9/46
[52] U.S. Cl. ...................... 395/725; 395/650
[58] Field of Search ................ 395/725, 650, 700; 364/136

[56] References Cited

U.S. PATENT DOCUMENTS

| | | | |
|---|---|---|---|
| 4,858,102 | 8/1989 | Lovrenich | 364/136 |
| 4,888,726 | 12/1989 | Struger | 395/200 |
| 4,912,628 | 3/1990 | Briggs | 395/650 |
| 4,972,365 | 11/1990 | Dodds | 364/136 X |

OTHER PUBLICATIONS

Introduction to Real-Time Software Design, 2d Edition, 1987, S. T. Allworth and R. N. Zobel, MacMillan Education Ltd., Publishers—Table of Contents, pp. 167, 135–137, 140–143.

*Primary Examiner*—Jack B. Harvey
*Assistant Examiner*—Glenn A. Auve
*Attorney, Agent, or Firm*—Winstead Sechrest & Minick

[57] ABSTRACT

A system and method for controlling devices and processes using an interrupt system which is arranged to function as a state machine system. The design of the system is such that the state machine interrupt handler has control of the underlying operating system, memory and memory stack so as to be able to define and handle nested states. The interrupt system is capable of quiescent states and can span many independent process stimuli.

24 Claims, 14 Drawing Sheets

PROCEDURE FOR ENCODING A STIMULUS

SYSTEM FUNCTION OVERVIEW

SYSTEM INITIALIZATION

PROCEDURE FOR ESTABLISHING HOME POSITION

PROCEDURE FOR PERFORMING REQUESTED MOTION

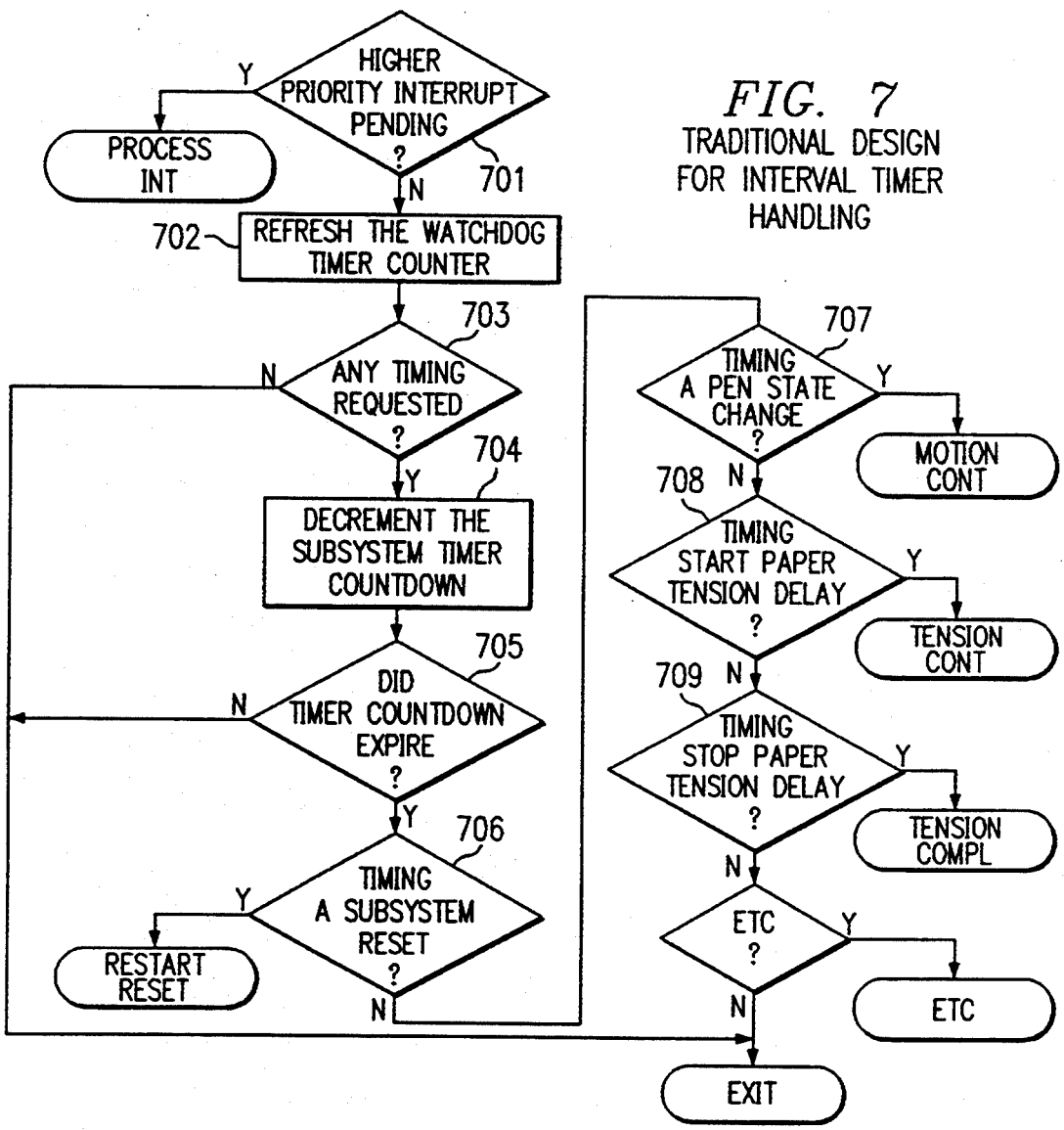

FIG. 7
TRADITIONAL DESIGN FOR INTERVAL TIMER HANDLING

FIG. 8
STATE STIMULUS TABLE FORMAT DESCRIPTION

| |
|---|
| STATE ENTRY PROCEDURE ADDRESS — 801 |
| WATCHDOG EXPIRED STIMULUS PROCEDURE ADDRESS — 802 |
| INTERVAL TIMER STIMULUS PROCEDURE ADDRESS — 803 |
| LIMIT SWITCH SENSE STIMULUS PROCEDURE ADDRESS — 804 |
| COMMAND ERROR STIMULUS PROCEDURE ADDRESS — 805 |
| REGISTER WRAPAROUND STIMULUS PROCEDURE ADDRESS — 806 |
| POSITIONING ERROR STIMULUS PROCEDURE ADDRESS — 807 |
| INDEX POSITION SENSE STIMULUS PROCEDURE ADDRESS — 808 |
| TRAJECTORY COMPLETED STIMULUS PROCEDURE ADDRESS — 809 |
| BREAKPOINT REACHED STIMULUS PROCEDURE ADDRESS — 810 |
| SPURIOUS INTERRUPT STIMULUS PROCEDURE ADDRESS — 811 |

PROCEDURE FOR ENCODING A STIMULUS

PROCEDURE FOR PERFORMING SUBSTATE CALL

STACK USAGE BY STATE DRIVEN INTERRUPT HANDLER

PROCEDURE FOR SUBSTATE RETURN

GENERAL PURPOSE
TIMED DELAY ROUTINE

FIG. 14
TIMED DELAY SUBSTATE DESCRIPTION

STIMULUS TABLE

| |
|---|
| DELAY_ENTRY () PROCEDURE ADDRESS |
| RETURN_ERROR () PROCEDURE ADDRESS |
| DELAY_TIMER () PROCEDURE ADDRESS |
| RETURN_ERROR () PROCEDURE ADDRESS |
| RETURN_ERROR () PROCEDURE ADDRESS |
| RETURN_ERROR () PROCEDURE ADDRESS |
| IGNORE_EVENT () PROCEDURE ADDRESS |
| IGNORE_EVENT () PROCEDURE ADDRESS |
| IGNORE_EVENT () PROCEDURE ADDRESS |
| IGNORE_EVENT () PROCEDURE ADDRESS |
| IGNORE_EVENT () PROCEDURE ADDRESS |

1401

DELAY_ENTRY () PROCEDURE:
IGNORE_EVENT () PROCEDURE:

( RETURN )
1402

DELAY_TIMER () PROCEDURE:

[DECREMENT SUBSYSTEM TIMER COUNTDOWN] —1404

↓

TIMER COUNTDOWN EXPIRED ? —1405
 Y → ( STATE SUCCESS RTN ) 1407
 N → ( RETURN ) —1406

RETURN_ERROR () PROCEDURE:

( STATE ERROR RTN )
1403

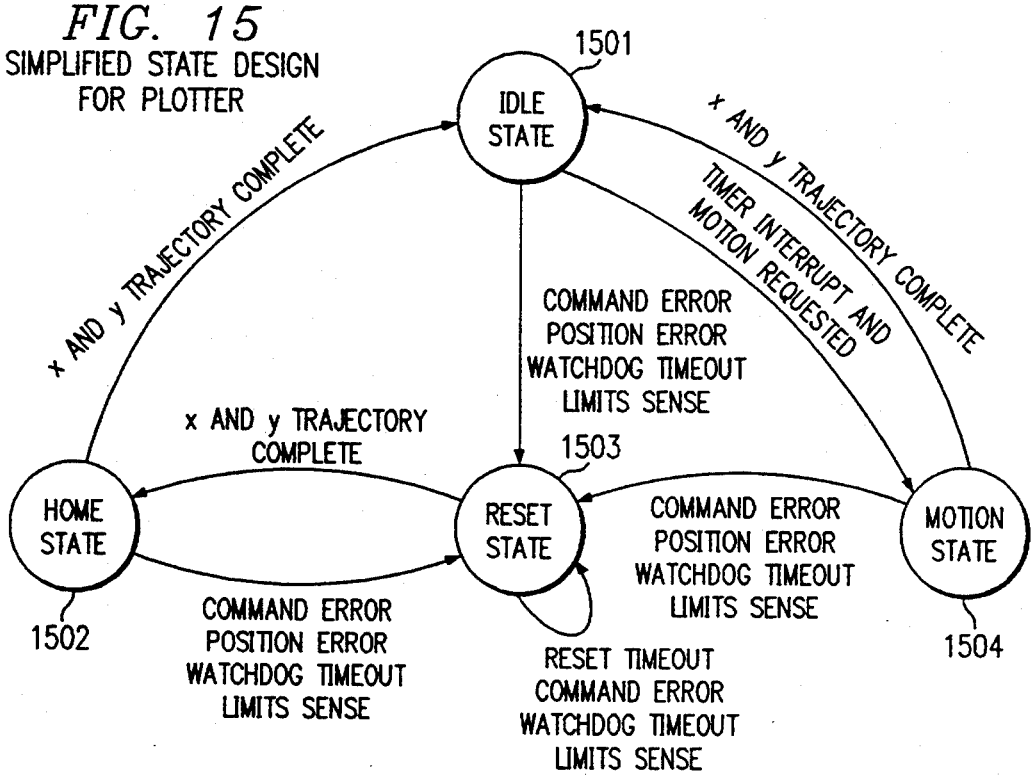

FIG. 15
SIMPLIFIED STATE DESIGN FOR PLOTTER

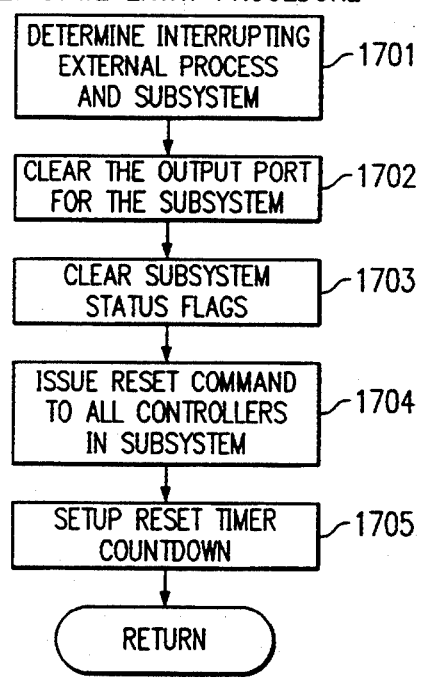

FIG. 17
RESET STATE ENTRY PROCEDURE

FIG. 16
RESET STATE DESCRIPTION
STIMULUS TABLE 1601

| RESET_ENTRY () PROCEDURE ADDRESS |
| ENTER_RESET () PROCEDURE ADDRESS |
| RESET_TIMER () PROCEDURE ADDRESS |
| ENTER_RESET () PROCEDURE ADDRESS |
| IGNORE_EVENT () PROCEDURE ADDRESS |
| IGNORE_EVENT () PROCEDURE ADDRESS |
| IGNORE_EVENT () PROCEDURE ADDRESS |
| IGNORE_EVENT () PROCEDURE ADDRESS |
| RESET_STATUS () PROCEDURE ADDRESS |
| RESET_STATUS () PROCEDURE ADDRESS |
| IGNORE_EVENT () PROCEDURE ADDRESS |

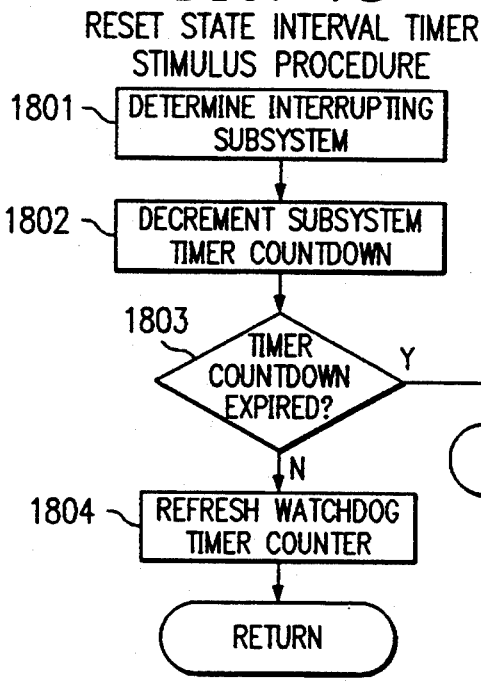

IGNORE EVENT STIMULUS PROCEDURE

SUBSTATE PROGRESSION OR NEXT_STATE () PROCEDURE

PROCEDURE FOR INTERRUPT PROCESSING

SYSTEM AND METHOD FOR CONTROLLING INTERRUPT PROCESSING

This is a continuation of application Ser. No. 07/608,191, filed on Oct. 31, 1990, now abandoned.

TECHNICAL FIELD OF THE INVENTION

This invention relates to process control systems and more particularly to such systems where the various processes are controlled, in part, by a state machine interrupt handler system.

BACKGROUND OF THE INVENTION

State machine design is a technique of viewing a mechanical, electrical, or software system as a process which is driven between quiescent "states" (in which it waits for something to happen) by external events, or "stimuli."

State machine design is predicated upon the existence of a "process." In classic state machine designs for software systems, "process" has a specific connotation expressed by various operating systems as "process", "task," "program execution" or some similar term. It means simply that the sequence of instructions comprising the software system have been assigned the resources necessary for existence (such as memory allocation, stack allocation, process identification, etc.), execution (priority, process control block, etc.), and access to operating system services (file descriptors, message buffers, etc.). With these resources the software system can arrange to enter a quiescent state, to be scheduled upon the occurrence of some stimulus, and to maintain its existence over the duration of events.

In contrast to processes, interrupt handlers are executed at the request of the associated devices. The device itself generates a hardware signal which literally interrupts the computer and causes control to be transferred to the interrupt handler. The interrupt handler has the responsibility of determining the cause of the interrupt, of performing appropriate action to service the interrupt, and then restoring control to the interrupted process. Traditionally, interrupt handlers are viewed as being small, short-lived, and repeatedly invoked at random intervals. In fact, many operating systems place severe restrictions on the amount of time which an interrupt handler may consume in the servicing of an interrupt and permit the handler almost no access to operating system services.

Compared to interrupt handlers, processes tend to be long-lived, large, and to have only a single invocation. They have been favored for device supervision because they are single threaded, have a more permanent existence, have access to system resources (particularly memory and stack space), and have full access to operating system services.

To the very limited extent that state machine designs have been used for the supervision of devices attached to a computer, the approach has been to write a simple interrupt handler which arranges to signal events to some program which actually provides supervision for the device control. This scheme has some immediate advantages:

1) the interrupt handler provides little device control, an advantage since it is invoked asynchronously by the device itself;
2) the program providing the supervision runs as a process with full access to operating system services and resources; and
3) the process provides supervision, an advantage since it generally possesses a more well defined execution sequence.

However, the many problems with this traditional approach are:
1) As device controllers become more sophisticated:
   a) an increasing amount of information needs to be communicated between the interrupt handler and the supervising process;
   b) an increasing amount of CPU overhead is consumed by the scheduling of the supervising process; and
   c) control of multiple devices by a single device controller is becoming prolific resulting in another layer of supervising processes.
2) In many instances this scheme is too slow to respond to critical events; and
3) It is difficult for the supervising process to obtain pertinent status information since it is scheduled sometime after the interrupt occurs.

Thus, there is a need in the art for such a system which responds in real time to stimuli and asynchronous demands. This system must be capable of functioning without the benefit of those resources normally provided by an operating system and must be reduced to practice in a manner consistent with those constraints placed on interrupt handlers by operating systems, including constraints on computer CPU time and stack memory usage.

There is a further need in the art for a system which will allow for computer control of several processes, all working concurrently, and all requiring constant monitoring and corrections.

There is a still further need in the art for a system of controlling external systems, such as motors, which must be coordinated but which operate independently from each other and which require control monitoring.

SUMMARY OF THE INVENTION

I have designed an interrupt handler which functions to control machine processes and which is designed in the form of a state machine. The design of the system is such that the state machine interrupt handler has control of the underlying operating system memory and stack memory.

The design of the interrupt state machine has introduced the concept of "external processes" being controlled by peripheral controllers which control the devices of each process. The sequence of device events is communicated to the CPU via an interrupt handler.

My system is realized by equipping the interrupt handler with a mapping from the interrupt reason (stimulus) to the external process. The implementation of this mapping is application dependent and depends on the exact nature and configuration of the peripheral controller(s).

As an example, an interrupt handler is provided for a motion controller (MC). Each MC provides positioning control for three servomotors, limit switch detection, and timer support. Several boards may be installed in PC and will share the same interrupt request line.

Upon receipt of an interrupt, the interrupt handler polls each of the connected boards and determines the highest priority outstanding request. The request is then associated with a specific servomotor controller. The application may define a grouping of servomotor controllers into subsystems so that within a subsystem the motion of each servomotor can be coordinated. The control of each subsystem is viewed as an external process so the interrupt handler uses this application defined grouping to associate the external process with the physical servomotor controller and the interrupt stimulus.

This mapping of interrupt stimulus to external process is expressed by the selection of a state machine and the association of a state control block.

The instant embodiment includes the notion of a substate which may be called for in much the same way a procedure is called. Following the call for a substate we speak of the state machine as having been nested. Requests for state transitions by the external process affect only the most deeply nested state. In this way the configuration of the calling state remains in tact, and it is possible to perform a return to the calling state. In the interim, however, the called state retains the use of all of the functions provided by the state machine.

In the instant embodiment, a state machine selection is made by calculation of the address of a block of memory describing the machine. This information includes how deeply nested the state machine currently is, the address of the area of memory set aside for stack space usage by the external process, and an array of control blocks describing each of the nested states. Each state control block contains information such as a table describing how each possible interrupt cause is to be handled and which portion of the stack area is assigned to that state.

One aspect to the implementation is the arrangement for the interrupt handler to set aside an area of memory to be used for stack by each external process and the provision for selection of the appropriate area for the duration of the processing of each interrupt. This memory must be permanently reserved, since this stack is used to maintain the status of higher level states in a nested state design and must persist across interrupts. However, the area reserved for the lowest level state can, and should, be freely reused from one interrupt to the next which prevents the stack from growing indefinitely.

Accordingly, it is a technical advantage of my invention to use a single pointer to both separate the stack into permanent and temporary memory and to point to the return address destination.

It is a further technical advantage of my invention to provide a comprehensive implementation of a state machine having key components such as:
1) the definition of a "state;"
2) a mechanism for initializing the state machine;
3) the association of each stimulus with that portion of the software system designated to handle it for current state;
4) a mechanism for progression from one state to another;
5) the definition of a "nested state;"
6) a mechanism for calling a nested state; and
7) a mechanism for returning from a nested state to the calling state.

It is a still further technical advantage of my invention to provide a state machine interrupt handler for processing external processes, each requiring separate but coordinated and overlapping control for the various stimuli.

It is a still further technical advantage of my invention to provide a system for servo motor control where a cpu can, via an interrupt handler, allow each servo, or group of servos, to run as an independent process and to interrupt the cpu for system functions on a real time overlapping basis, even while many of the interrupts require a time longer than the overlap time available.

It is a still further technical advantage of my invention to provide a state machine controlled interrupt system having a common memory stack shared by several processes and having a single pointer for defining the permanent and temporary sections of the stack and also marking the return address location to the currently active process.

BRIEF DESCRIPTION OF THE DRAWINGS

A more complete understanding of the present invention may be acquired by referring to the detailed description and claims when considered in connection with the accompanying drawings in which like reference numbers indicate like features wherein:

FIGS. 3–23 show flow charts of how the inventive concepts are used to control the particular embodiment of FIG. 1.

DETAILED DESCRIPTION OF THE INVENTION

Figure 1:
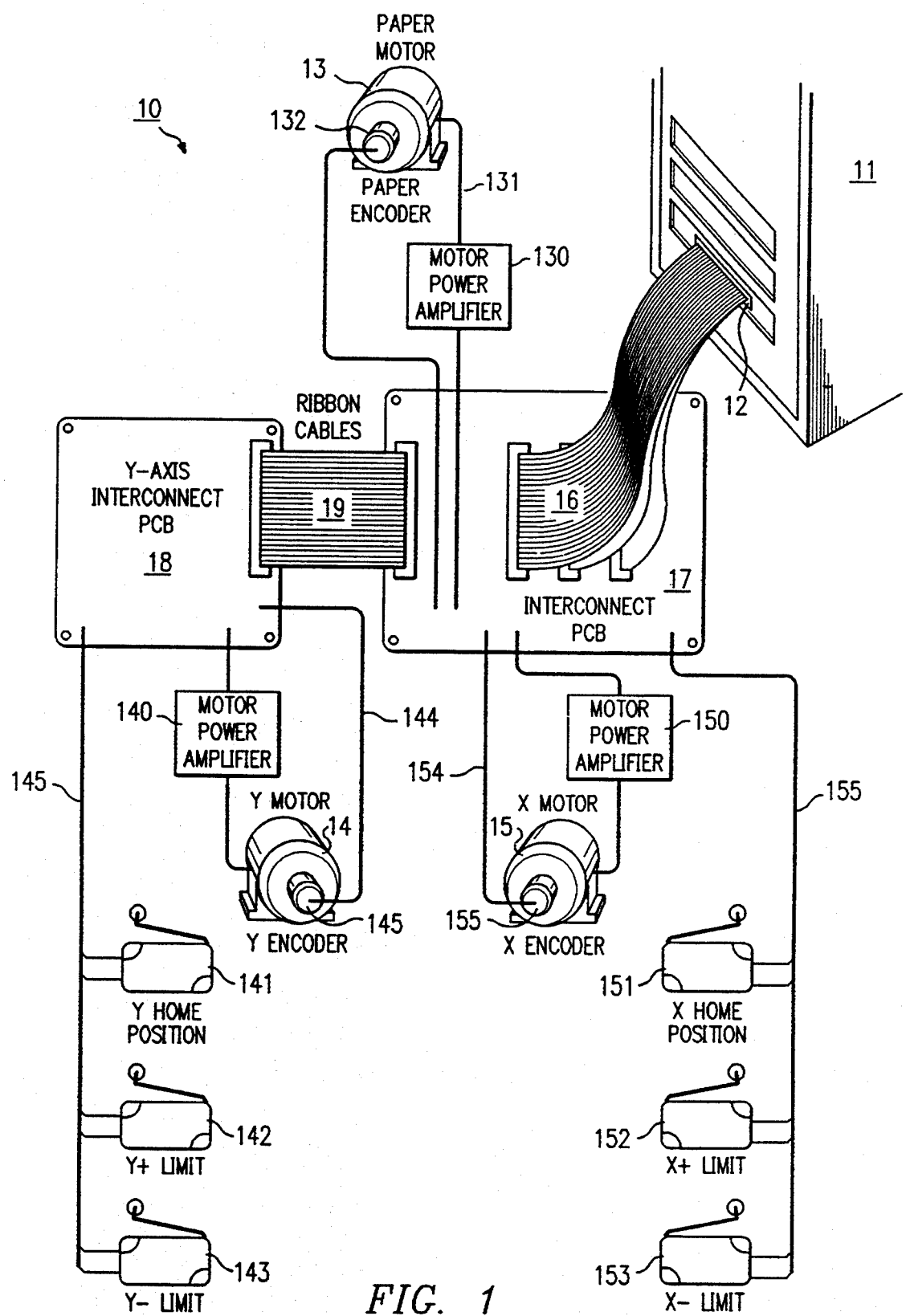
FIG. 1 shows one embodiment of the invention used in a servomotor controller system.

Before examining the details of my invention, a brief overview of interrupt handlers may be in order. For this discussion analogies will be made to human endeavors. It is important to realize that a process has a well defined execution sequence. It is like a business traveler with an itinerary: at any instant his location and the context of events are well defined. The traveler follows the itinerary blindly.

An interrupt handler, in contrast, has no such defined execution sequence. It is driven by external events. If the interrupt handler were to be a traveler, that traveler would wake up in a strange room every morning and must somehow attempt to establish where he is and what he is doing in that room. The interrupt handler must determine how he arrived at the current instant and where he is going. The trick is to somehow arrange to establish the context for the interrupt handler, that is, to keep track of which state our traveler is in.

In order to do this, we must provide the interrupt handler with a method for setting its initial state and for progressing from one state to another. The handling of any possible events must be specified for each state so that the interrupt handler is equipped with a mechanism to associate any event with its proper handling.

In addition, a useful implementation must provide the ability to call a substate and to return from the substate back to the current state. We will provide the same sort of context in the substate without affecting the existing context of the calling state. In other words, within the substate we may arrange to handle events differently, but on return everything is as it was before the substate call.

Finally, we recognize that the devices being connected to an interrupt handler are becoming increasing sophisticated and capable of independently performing many functions. The interrupt handler should be capable of overseeing several such devices in that it must maintain the state context for arbitrary groups of devices. Each of these independent device subsystems should be viewed as an "external process" with its own unique context.

The interrupt handler must be able to associate the interrupt cause with a particular device subsystem or external process. However, an interrupt handler has no context. Normally, it has no memory of events from one interrupt to the next. First of all, we must arrange to provide the interrupt handler with a state table for each external process. This table would keep track of which state (and substates) each external process is currently in.

Then we must recognize that it is desirable for substates to return to the calling state at the point from which they were invoked. This requires that we are able to save all of the information about the current state, including a complete traceback of procedure invocations and the values of all local variables. This sort of procedural context is usually provided via a stack.

Interrupt handlers traditionally make only transient use of the stack. The stack space required is simply stolen from the interrupted process for the duration of the interrupt. The stack is restored to its original state upon return from the interrupt. By making only transient use of the stack, the interrupt handler avoids consuming system memory for stack space as it continues to process more interrupts. Unfortunately, this makes a certain degree of amnesia inherent in interrupt handlers.

The crucial realization to the implementation of this concept is that such an interrupt handler requires two radically different stack areas. One area must be permanent; it must persist across interrupts in order to provide the procedural context of higher level states. The other stack area must be transient; it is only used for processing of the current interrupt and discarded. The use of a transient area prevents the interrupt handler from eventually consuming all system memory as millions of interrupts are processed.

This distinction is the machine counterpart to human long-term and short-term memory. It is not necessary for our traveler to remember what happened on Saturday night after the third martini, only that he must return on Monday, and he must somehow regain the context of events on Monday. In fact, the same area of memory may be used for both types of stacks as long as a mechanism is established to determine which portion is to be retained (permanent) and which portion is transient.

One specific embodiment of the concepts just discussed is shown in FIG. 1 where a state machine driven interrupt handler 10 for a plotter built is around the Technology 80, Inc., Model 5638 Servomotor Controller 12. This printed circuit card plugs into PC 11 and provides control of up to three servomotors 13, 14 and 15, as well as a timer and interrupt prioritizer (not shown). Positioning information is obtained from incremental optical encoders 146, 156 and 133, which are directly attached to the motor shafts and which provide electrical signaling to the servomotor controllers. The system also provides for the connection of limit switches 142, 143, 152 and 153, which indicate that the pen has moved beyond the normal drawing area to the physical limits of the table.

For convenience in making all of the electrical connections to the card, two printed circuit boards 17 and 18 interconnected by cable 19 are used to interconnect PC 11 via cable 16 and cables 131, 144, 145, 155, and encoders 132, 145 and 155, motor power amplifiers 130, 140 and 150 and limit switches 141, 142, 143, 151, 152 and 153.

Figure 2:
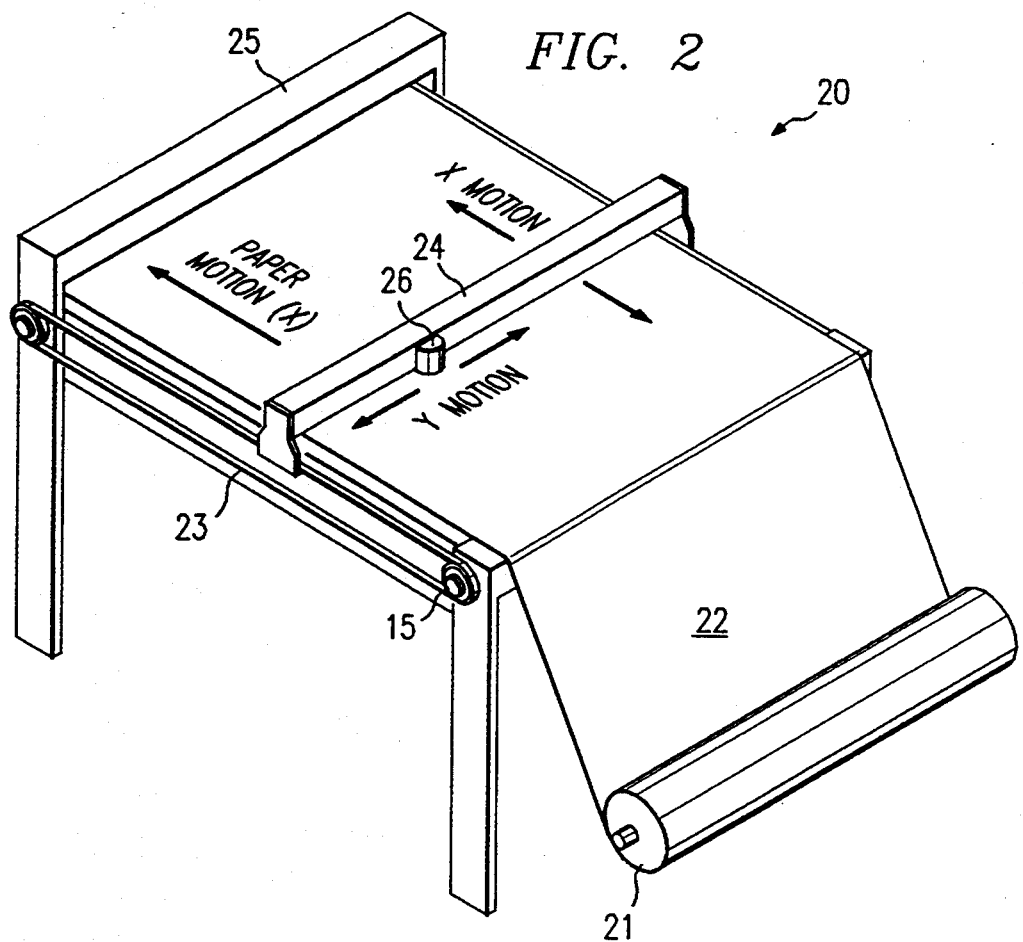
FIG. 2 shows the mechanical details of the servo embodiment.

As shown in FIG. 2, plotter 20 is a large flatbed plotter. Beam 24 spans the table and moves across the length of the table in the "x" direction. Pen carriage 26 moves back and forth across beam 24 in the "y" direction. In addition, paper 22 from a large roll 21 is moved across the table in the "x" direction to accommodate drawings which are longer than the table.

The paper motion and the drawing are sequential movements. However, during drawing the "x" and "y" motors must start and stop together and must be programmed to use coordinated accelerations and velocities to achieve movement in the proper direction. The system also provides support for a cutter with a third axis (z axis) for directional control of a knife.

Motors (and motion controllers) are grouped in a way defined by this application into subsystems. All motion within a subsystem is coordinated. However, subsystems (such as each cutting head) may move independently.

The combined motion of each subsystem is viewed as a process which is managed by the associated servomotor controllers. The servomotor controllers are in fact specialized microcomputers which require only occasional oversight. They use interrupts to communicate to PC 11 the need for supervision or the occurrence of significant events. These servomotor controllers provide the control for each subsystem which would have traditionally been incorporated into a supervising process (or task) with PC 11. The crucial realization is the desirability of equipping the "external process" for each subsystem with some of the resources which would have been accorded to a supervisory process (or any other process on the PC for that matter) by the operating system within PC 11 Since the motion controllers communicate with PC 11 via interrupts, the interrupt handler must be modified to handle the complexity of the chore.

Figure 3:
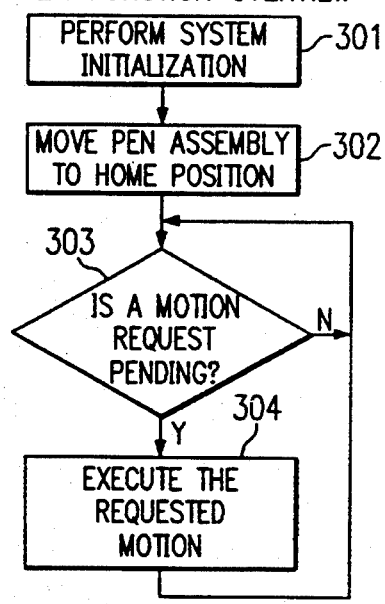

The nature of processes and interrupt handlers are radically different. Processes tend to be long lived and have a well defined execution sequence, whereas interrupt handlers appear to be invoked at random and to execute only long enough to respond to the interrupt cause. In fact, most operating systems place severe restrictions on the amount of processor time which an interrupt handler may consume responding to any single interrupt. Plotter Functions:

As shown in FIG. 3, the plotter function can initially be broken into several components: the controllers, timers, and I/O ports must be initialized, 301; the plotting head (the x and y motors) must be driven to a predefined "home position" 302; the software must wait for a request for motion or for I/O, 303; the requested motion or I/O must be performed, 304; and the software must await the next request. Each of these components involves a number of operations.

The initialization of the entire system, 301, is performed only once. This involves configuring the programmable timers and programmable interrupt controllers on the installed cards and initializing each of the subsystems.

Figure 4:
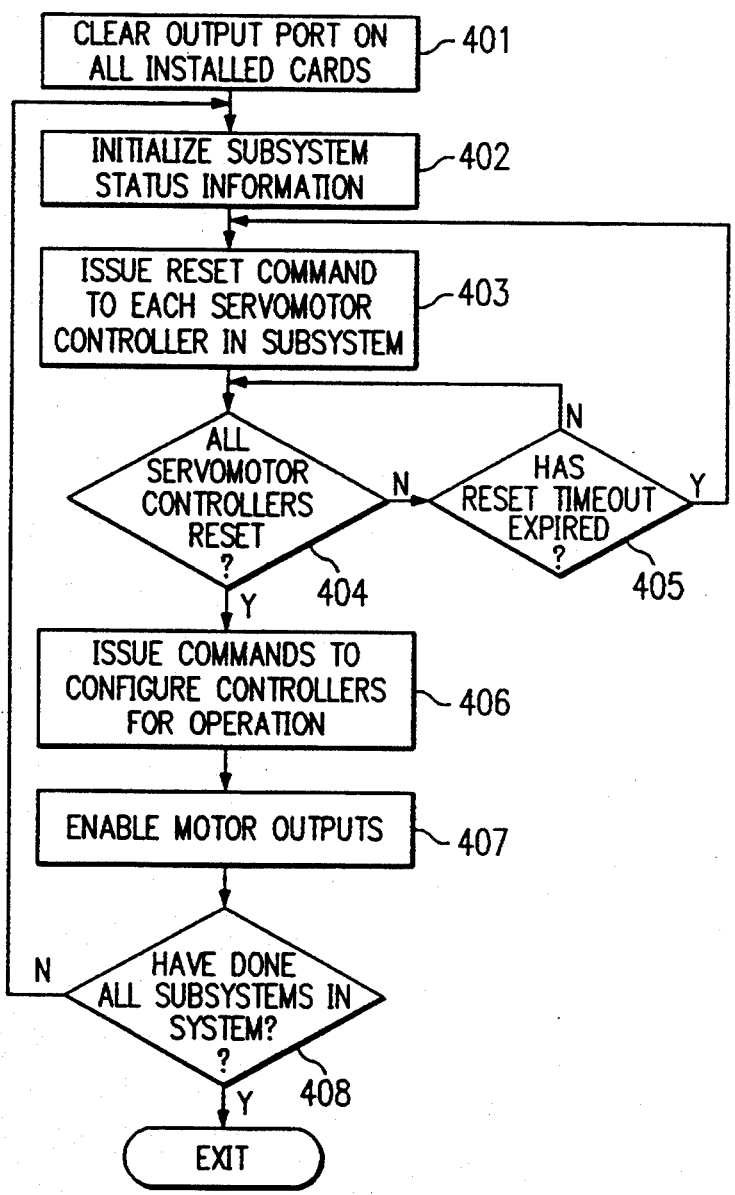

The initialization of each subsystem, described in FIG. 4, involves clearing any associated output bits, 401, initializing all status information, 402, enabling the motor outputs, 407, and resetting and configuring the associated servomotor controllers. To reset a motion controller, the software must issue a reset command to the controller, 403, and verify that within 1.5 milliseconds, 405, the status again changes to indicate that the reset is complete, 404. At this point, several commands must be issued to properly configure the controllers for operation, 406.

It should be noted that the interrupt handler is not permitted to wait for 1.5 milliseconds; this is much too long. It must arrange to set a timeout and to provide special processing of timer interrupts to determine if the status fails to change in the allotted time. In this event, the subsystem initialization will be restarted.

Figure 5:
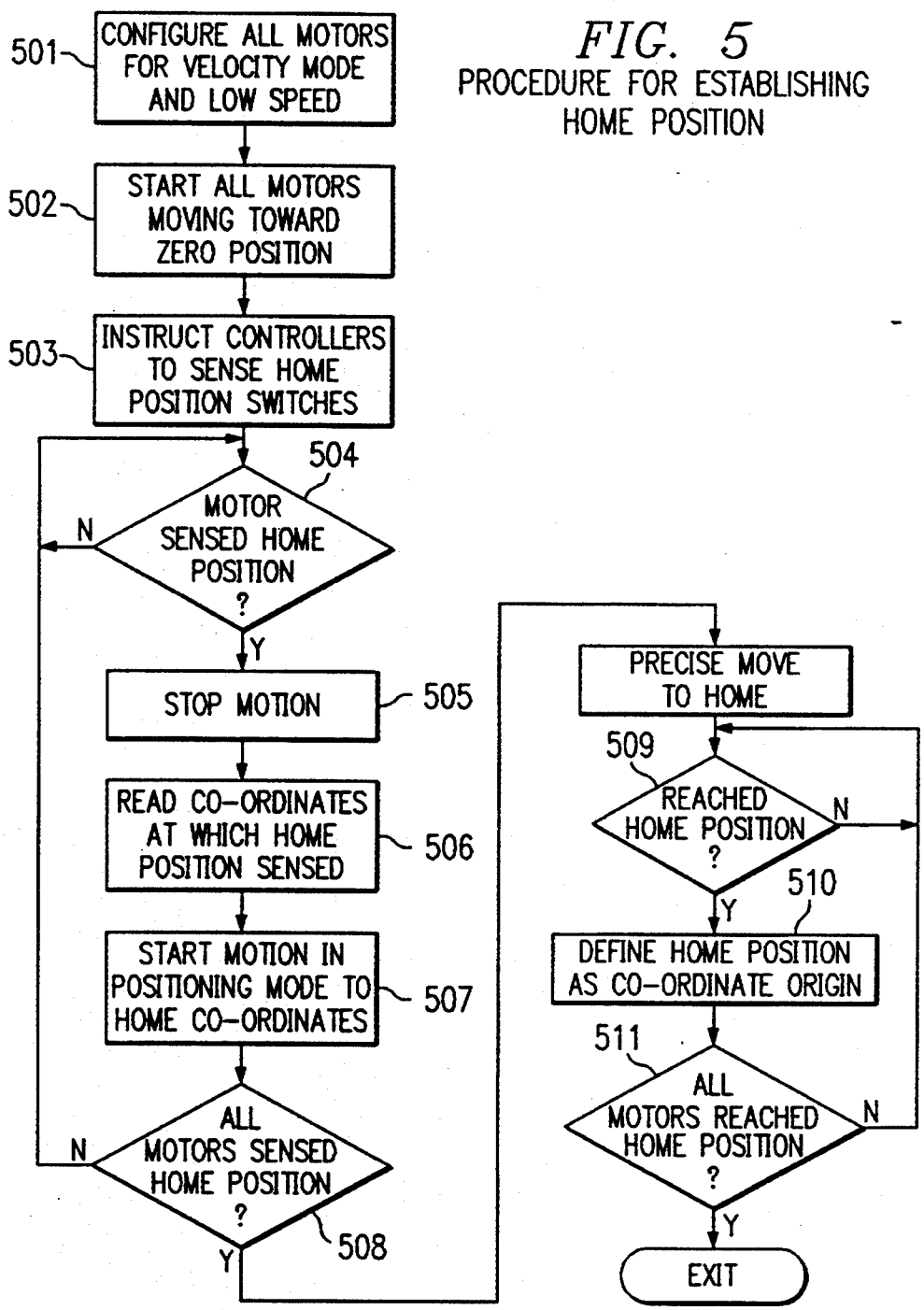

When the system is initially powered on, it has no knowledge of the plotting head (x and y motor) position. It is necessary to "home" the plotting head to establish this reference position which is indicated by special mechanically activated switches, 141, 151 (FIG. 1). Driving the plotting head to a home position also involves a number of operations, as shown in FIG. 5. First, the motors are enabled and driven in velocity mode (to no specific location) at low speeds in $-x$ and $-y$ directions toward the home position, 502. The servomotor controllers wait for a special electrical signal sensing the home position, 503.

Once an interrupt occurs indicating the detection of the home position, 504, the motors are stopped, 505, the location of the home is read, 506, and the motor is driven in positioning mode to that precise location, 507.

Once the motor again interrupts, indicating that it has arrived at the exact home position, 509, a command is issued to the motor controller to make the home position the zero coordinate position, 510. Then, once all of the motors, 511, have completed this scenario, the "homing" is complete.

Waiting for a request for motion or I/O means that whenever the interrupt handler becomes idle or processes an interrupt while it is idle, it should arrange to check to see if there are any outstanding requests.

Figure 6:
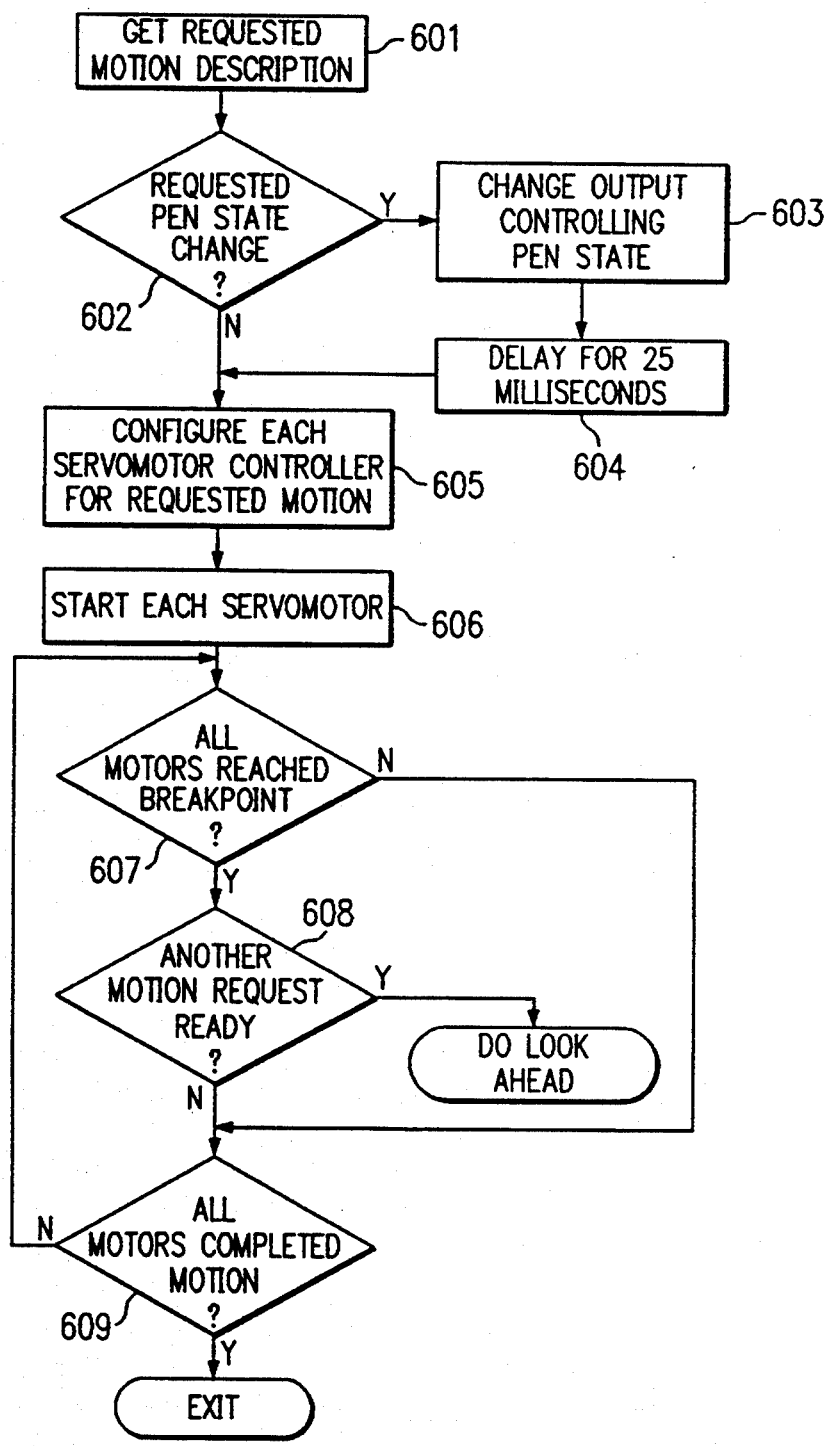

The performance of motion also has several components, as shown in FIG. 6. Motion requests also carry a pen state specification (up or down) with them. If the pen state changes, 602, an output bit controlling the pen solenoid is changed, 603, and a delay of 25 milliseconds is performed, 604. Again, the interrupt handler must arrange to provide special handling of timer interrupts to perform this delay, since it cannot prolong its execution for such a long time.

Following any changes to the pen state, the x and y axis servomotor controllers are instructed in the details of the movement to be performed, 605. The requested motion may then be initiated, 606.

If an interrupt occurs from each of the motors indicating a breakpoint position was encountered, 607, then it is possible to begin a new motion without completing the previous one, 608. Note that motion requests indicate the position of these breakpoints. If another motion request is waiting, it is started. Otherwise, it is necessary to wait for interrupts from all of the motors indicating that the initiated motion has completed, 609.

Requests for I/O may be timed I/O. In this case, the interrupt handler must arrange to provide special processing of the timer interrupts for timing the I/O. Such timed delays are used, for example, for timing the paper tensioning procedure, 708, FIG. 7, and following a paper advance, 709, timing the duration of the signal to activate the paper cutter at the end of job, etc.

The previous discussion touches on several points. The following observations are pertinent.

First, the control of the plotter is exercised over many interrupts. Even a simple motion request may involve the processing of a number of interrupts.

Second, there are a number of causes for interrupts:
1) a watchdog timer has expired without being refreshed,
2) an interval timer (one millisecond) has expired,
3) the pen assembly has encountered a mechanical limit,
4) a servomotor controller has detected a command error,
5) a position register has incremented (decremented) past its maximum (minimum) value,
6) a motor has failed to achieve the proximity of its commanded position,
7) an index or home position has been sensed,
8) a requested motion has completed, or
9) a breakpoint position has been reached.

Third, these interrupt causes may require very different handling at each stage of performing control of the plotter.

Fourth, while this discussion considered a relatively simple two-axis positioning system, a decision on how to handle a specific event (such as a timer interrupt) is fairly involved. One must answer a number of questions to establish the precise context of the event.

Fifth, the discussion ignores the complications imposed by consideration of the occurrence of errors. The handling of various errors or events may differ dramatically as the interrupt handler is idle, performing initialization, performing motion, etc. Each of the indicated causes of an interrupt must be properly handled regardless of the instant at which it occurs.

As discussed above, a major problem confronting an interrupt handler is that of establishing the current context within which the interrupt should be processed. The traditional approach has always been to set aside a block of memory for maintaining status information which describes the progress of events. This status information must be examined upon each interrupt to determine the appropriate response.

An example of how a timer interrupt might be handled using this traditional approach is presented in FIG. 7. First, a determination is made if the interrupt has another, higher priority, cause, 701. If not, then the watchdog timer countdown is refreshed, 702. The watchdog timer insists on being refreshed within 10 millisecond intervals or it will automatically disable the motors, having assumed the computer is inoperable. If any timing has been requested, 703, the subsystem timer is decremented, 704. If the timer has reached a zero countdown, 705, then it is necessary to test status information for the subsystem in an attempt to determine the reason for the timing request, 706 through 709. The type of timing requested will determine where control will be directed.

The obvious observations are that:
1) even this relatively simple system has a fair amount of status information to be examined;
2) the testing of all of this information on every timer interrupt is not very efficient;
3) the flow of control through the interrupt handler is largely non-sequential;
4) in general, it will not be very obvious if error handling is provided for every scenario; and
5) it will be clumsy to add new features to the interrupt handling since the processing for each of the possible interrupt causes may be affected by any new feature.

The fact that events are presented to the interrupt handler asynchronously and that the flow of control through the interrupt handler is non-sequential have made the development of interrupt handlers a very specialized art.

Since interrupt handlers are notoriously difficult to debug, the favored approach has been to make them as straightforward as possible and to move the control into a supervising process. The supervising process has a more well defined execution sequence and is easier to debug. Historically, most device interfaces have been simple so this approach has made sense.

State Machine Design

Although state machine designs are only rarely seen outside of message driven software systems, they can be applied to this type of supervisory process. State machine designs presuppose the existence of a process which is driven from one "state" to another by events (or "stimuli"). Usually the stimulus is the receipt of a message carrying some specific request or indication of an event.

In this type of design, the process always goes to a central place (in the code) to receive a message. It handles the message and returns again to receive the next message. The definition of the current state provides the context for the handling of the type of message received. In the simplest implementation, the state definition is equated to a table of procedures which will handle a message of every defined type (i.e., each stimulus). Which procedure is called from this stimulus table depends on which type of message is received.

It can be arranged to handle subsequent messages differently, using a new state definition, if the stimulus procedures are provided a mechanism to specify entry into a new state. In this manner complete applications can be constructed based on scenarios of expected (and unexpected) messages and modeled as a sequence of states with transitions driven by these stimuli.

Although this design approach could be extended to a supervisory process for a plotter, the following problems present themselves:
1) the amount of information to be communicated from the interrupt handler to the supervisory process is substantial, and
2) once the interrupt handler has communicated information through a signal or message, the process must await scheduling by the operating system. This has two additional consequences:
   all of this scheduling is very inefficient, and since the process is started sometime after the interrupt, it is very difficult to ascertain the worth of the status information communicated—the current status may be significantly different; and
3) the classical implementations of mechanisms for state transitions are rather elaborate and carry a significant real-time penalty.

Just as the message driven state machine goes to a central point to wait for all messages, the interrupt handler exists and waits for the next interrupt request to direct control to a central point (the entry point for the interrupt handler). The interrupt causes may be categorized by reading status registers to determine the reason for the interrupt.

This view of a state machine design was the motivation for the plotter implementation. However, a number of complications and concepts pertinent to the interrupt handler environment will be introduced as the discussion progresses.

State Machine Implementation

The implementation was predicated on four precepts:
1) it must remain clearly focused on the fundamental distinctions between a process and an interrupt handler,
2) it must provide enough functionality to be genuinely useful,
3) it must be reduced to practice within the constraints imposed by the host operating system, and
4) it must be extremely efficient to be of any value.

As mentioned, the definition of a state is intimately tied to the table of procedures for handling each stimulus. FIG. 8 outlines the format of such a table specifying internal events and the causes of interrupts from the Technology 80 interface card. The meanings of the stimuli are summarized below.

Reference 801:

The state entry stimulus is internally generated and provides a mechanism for executing any processing required on entry into the state.

Reference 802:

The watchdog timer event stimulus is generated by the programmable watchdog timer on the interface PCB. If the interrupt handler fails to refresh the watchdog timer every ten milliseconds, this stimulus is generated and the servomotor drive signals are automatically disabled.

Reference 803:

The interval timer event stimulus is generated at one millisecond intervals by a programmable timer on the interface PCB.

Reference 804:

The limit switch detect stimulus is generated by means of a mechanical switch if the pen assembly moves to any boundary of the table. This even is also accompanied by automatic disabling of the associated motor drive signal.

Reference 805:

The command error stimulus indicates that one of the servomotor controllers detected an error in the command sequence sent to it.

Reference 806:

The position register wraparound stimulus indicates that the position register for one of the servomotor controllers has incremented or decremented beyond its maximum value and reset to a zero value.

Reference 807:

The positioning error stimulus indicates that a servomotor has failed to achieve the proximity of its commanded position.

Reference 808:

The index position sense stimulus indicates that the servomotor controller has been instructed to look for the home position and has detected it.

Reference 809:

The trajectory complete stimulus indicates that the servomotor has completed a requested motion.

Reference 810:

The breakpoint reached stimulus indicates that a servomotor has reached a position previously designated as a breakpoint.

Reference 811:

The spurious event stimulus defines process for an interrupt which has no apparent cause (other than hardware failure).

Figure 9:
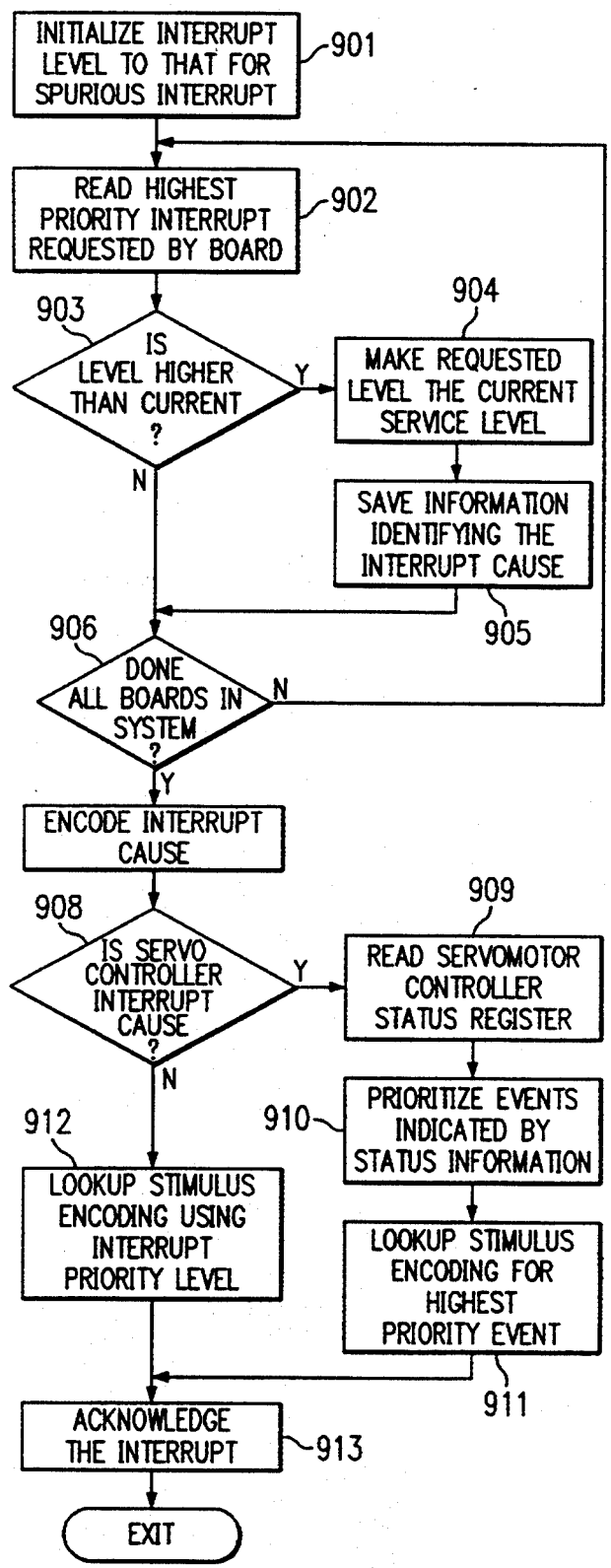

FIG. 9 summarizes a procedure, invoked on entry into the interrupt handler, which determines the highest priority pending interrupt request from the motion control PCBs and encodes the interrupt cause as a stimulus index. The spurious event is assigned the lowest priority, 901. The procedure reads the programmable interrupt prioritizer (Intel 8259A) on each motion controller PCB to determine the highest priority interrupt requested by the card, 902. If the requested interrupt is of a higher priority than the current service level, 903, then the requested level is assigned as the current service level, 904. This sequence is repeated for all of the boards installed in the system, 906. If the interrupt source is not a servomotor controller, 908, then the stimulus encoding can be looked up from the interrupt priority level, 912. Otherwise, the servomotor controller status register must be examined, 902 and the indicated servomotor related interrupt causes prioritized, 910 and the associated stimulus obtained from a lookup table 911. Finally, the interrupt selected for service should be reset, 913 by sending an acknowledgement to the programmable interrupt prioritizer on the motor controller PCB (and to the servomotor controller if appropriate).

The interrupt handler must be responsible for involving a procedure to encode the interrupt cause as a stimulus, 2302 (FIG. 23) determining the current state, 2304, indexing into the state's stimulus table, 2306 and 2307, calling the referenced procedure, 2308, and performing an orderly exit. An explanation of the remaining details of FIG. 23 will await the introduction of a few additional concepts.

Figure 22:
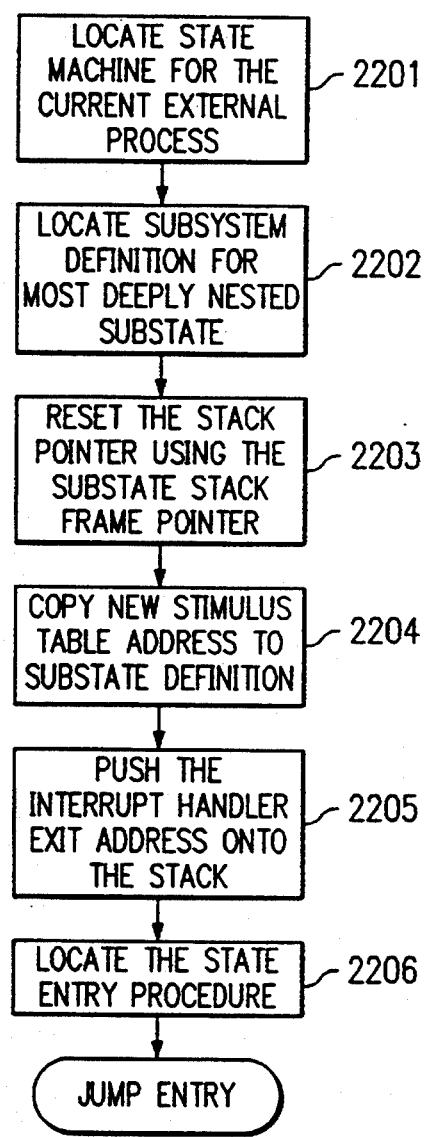

A utility procedure, which will be called next__state, must be made available to the stimulus procedures to enable them to specify that a new state is to be entered. In this way, a stimulus procedure can in effect say, "Something new has happened We should enter a new state in which all subsequent interrupts are to be handled differently." This utility will do little more than to specify that a new stimulus table is to be used, 2203, FIG. 22, and will invoke the state entry procedure defined in the new stimulus table, 2205 and 2206. FIG. 22 will be more thoroughly discussed below.

In this scenario the first question to be answered is exactly who is referenced by " . . . We should enter a new state . . . " It will be recalled that a state machine design is predicated on the existence of a process and an interrupt handler is not a process. Consideration of the problem of a hypothetical cutter with two cutting heads helps to clarify this issue. Consider that each cutting head is controlled by three motors and that each cutting head may move independently; only the motion of the motors comprising each cutting head (or subsystem) must be coordinated. Since the subsystems move independently, clearly they can be different states. The motion of each subsystem is, in effect, an "external process." In this case, the interrupt handler services two external processes, each of which requires a separate state machine.

Figure 23:
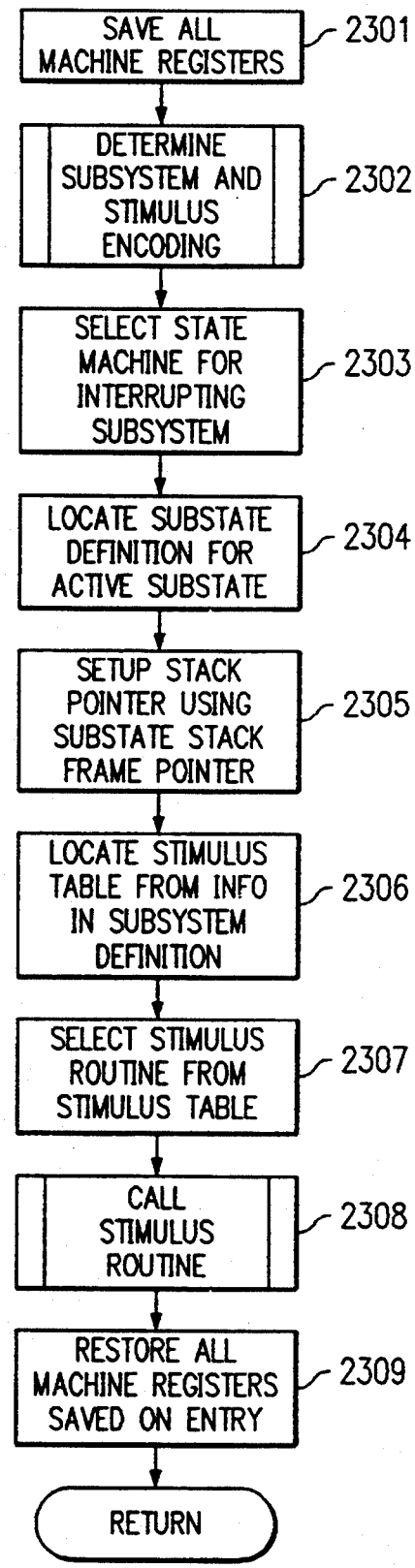

So the routine to encode the interrupt cause into a stimulus must know, 905, FIG. 9, the application defined mapping of the motor controllers into subsystems (and consequently external processes). This routine can then identify both the external process and the stimulus associated with the interrupt. When the interrupt handler determines the current state, it must select the state machine on the basis of which external process is associated with the interrupt, 2303 (FIG. 23).

Returning to the functional description presented earlier, our next likely observation should be the frequent use of delays. We might expect to write a procedure to perform a general purpose delay. However, we are immediately confronted with the problem that the delay is timed by timer interrupts; that is, the processing of the delay occurs over many interrupts and must itself be implemented as a separate state. Yet we would like to keep the state from which the delay is requested unperturbed and to return to it as if nothing (other than the delay) had transpired.

Figure 11:
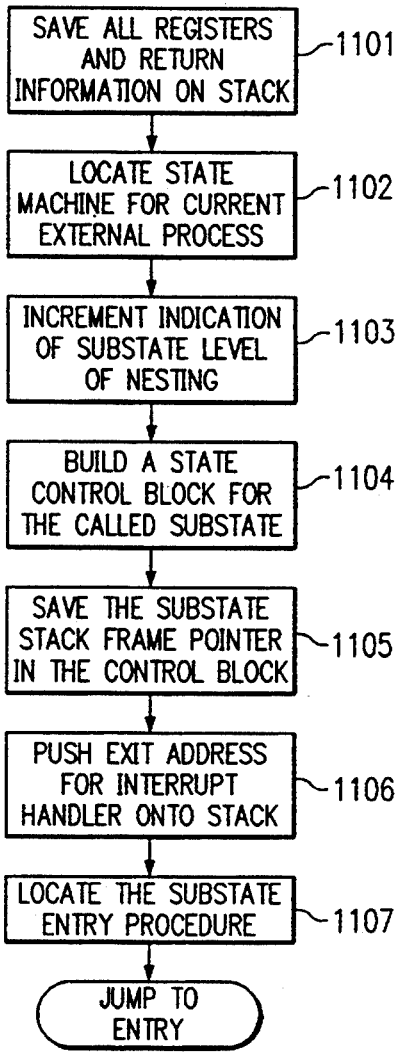
Figure 10:
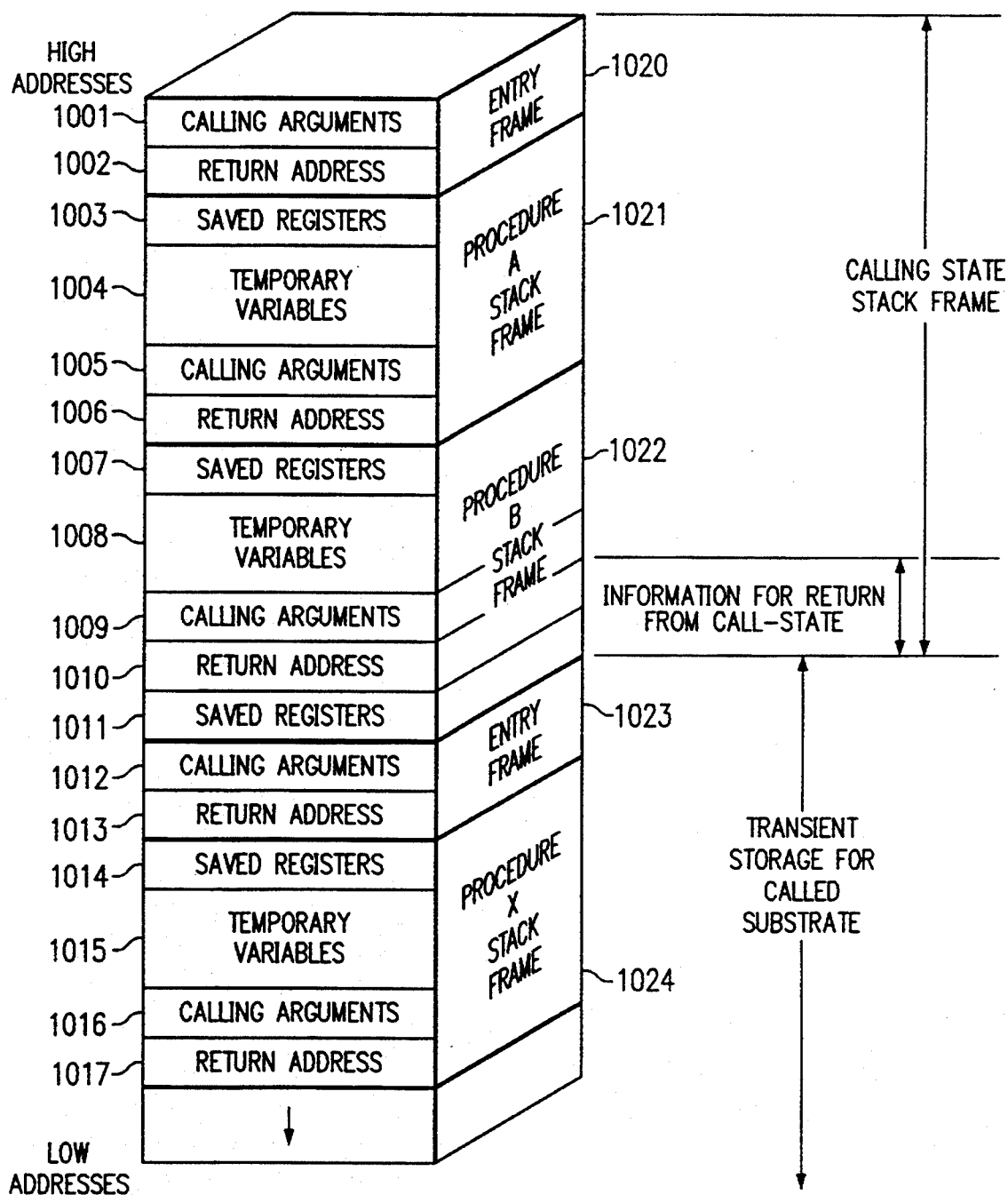

FIG. 10 shows the stack usage handler while FIG. 11 shows the procedure to call other procedures which may in turn call more procedures and so on. Each procedure maintains all pertinent information concerning its execution, 1003, 1005, and 1006 and local variables 1004 on the stack, as shown in FIG. 10. Each procedure call sets aside an area of the stack dedicated to the called procedure, 1022, referred to as a stack frame. Each procedure return frees up the allocated stack frame and makes the caller's frame, reference 1021 again the current stack frame. The number of stack frames on the stack at any instant reflect how deeply nested the procedure calls have become.

In the classic message driven state machine design, it is often necessary to perform common functions which may require the reception of several messages to complete. Functions to perform substrate calls and substrate returns are normally provided in such designs. The information for returning from the called states is saved separately, while the nesting of stack frames for called procedures continues on the process's stack.

Remember again that an interrupt handler is not a process and does not have a dedicated stack. In fact, it is traditional for the interrupt handler simply to make temporary use (for the duration of the processing of the single interrupt) of the stack owned by the interrupted process. This short term memory is obviously not adequate for maintaining the information related to the state nesting; some type of long term memory must be provided which will persist across however many interrupts are involved in the substrate processing.

Clearly, if a state machine design is to be successfully applied to an interrupt handler, then the concept of an external process must be reintroduced. It will be necessary to equip this external process with another of the resources normally accorded a real process by the operating system, namely, a process stack. The interrupt handler must provide a stack area for each external process and must select the area to be used based upon the external process associated with the particular interrupt being serviced.

Now, when a real process is scheduled by the operating system for execution, a stack pointer is part of the information setup for the process execution. When the operating system decides to select another process for execution, it saves the stack pointer of the suspended process so that it may be restored upon the next scheduling of that process. In the same way, the interrupt handler must arrange to maintain a stack pointer indicating the current usage of the stack area associated with each external process. The obvious solution would be to save the stack pointer for the external process on each exit from the interrupt handler and to restore the stack pointer on each entry.

A more efficient and useful approach can be implemented. It is customary to use the interrupted process's stack since an interrupt handler normally makes only transient use of the stack while processing a single interrupt. A more permanent stack area is required for maintaining the procedural context of each of the calling states. In this view of a stack composed of transient and permanent areas, the external process can be assigned a transient stack area for temporary use until a request to call a substate is encountered. At this point, the stack area must be made permanent.

This scheme is extremely straightforward to implement. It is only necessary to save the stack pointer whenever a substate call is encountered. In a machine where the stack grows downward (such as the IBM PC), the stack above this pointer is permanent and the area below may be used for transient storage for interrupt processing within the called substate, 1022 and 1023. In essence a stack frame associated with the substate has been created. The advantage is that the same pointer not only locates the transient area (below the pointer) but can also be used to locate the information concerning the return address, 1010 and registers, 1011 from the calling state (immediately above the pointer). This information is essential to the return_state procedure, enabling the substate to return to the calling state.

In a classic state machine it is customary to copy all of the return information into the substate definition. To instead place the information in the substate stack frame 1010 and 1011, not only makes the information easier to locate, but makes the substate stack frame organization similar to that for a procedure stack frame. This similarity reduces the work to be performed by the call_state and return_state procedures to the extent that they become trivial.

The definition of a substate can then be expressed by two pointers: one to the stimulus table defining how every event is to be handled and another pointer to the transient stack area for the substate. The information for the substate return is known to be immediately above this transient area. The substate definition is constructed upon the substate call; the interrupt handler uses the stack base for the substate to setup the stack pointer for the external process's state machine. This stack pointer provides the final missing resource for this implementation.

To review then, a state machine definition is comprised of:
1) an indication of the current level of nesting of substates (of how many call_state requests have been made without matching return_state requests),
2) a substate definition for the base state, including a pointer to the stimulus table for the base state and a pointer to the stack area allocated for the associated external process, and
3) a substate definition for each of the called substates.

We can now complete our description of the interrupt handler procedure presented in FIG. 23. It is necessary to save all registers upon entry into the interrupt handler, 2301, to determine the subsystem (external process) which has requested the interrupt, 2302, to select the state machine associated with the interrupting external process, 2303, to locate the substate definition for the active substate, as indicated from the current level of substate nesting, 2304, to set the stack pointer to the substate stack frame for the active state, 2305, to locate the stimulus table using the substate definition, 2306, to index the stimulus table with the stimulus, 2307, to call the indicated stimulus procedure, 2308, and finally to restore all saved registers and return from the interrupt, 2309.

In the same manner, the state progression procedure, next_state, presented in FIG. 22 is modified. The procedure must determine the active state machine associated with the interrupting external process, 2201. It must use the current level of substate nesting to index the active substate definition, 2202. It must reset the stack pointer to the start of the transient area specified by the substate stack frame pointer, 2203. It must place the new state's stimulus table address in the substate definition, 2204; and finally it should stimulate a call to the called state's entry procedure which appears to emanate directly from the interrupt handler, 2205 and 2206. This simulated call allows the state entry procedure to perform a normal procedure return to complete the processing of the interrupt, since the return address sends the entry procedure to the interrupt exit, 2309.

It is important to realize that a state progression affects only the currently active (most deeply nested) substate. That is, a substate can cycle through states to compete its own processing before performing a substate return to return to the calling state. This allows a general implementation of a state mechanism.

The procedure for performing a substate call is largely identical to that for state progression and is presented in FIG. 11. The primary difference is that this procedure must save all of the registers on entry, 1101, must increment the level of substate nesting in the state machine definition, 2203, and must build a substate definition for the called substate, 1104.

Figure 12:
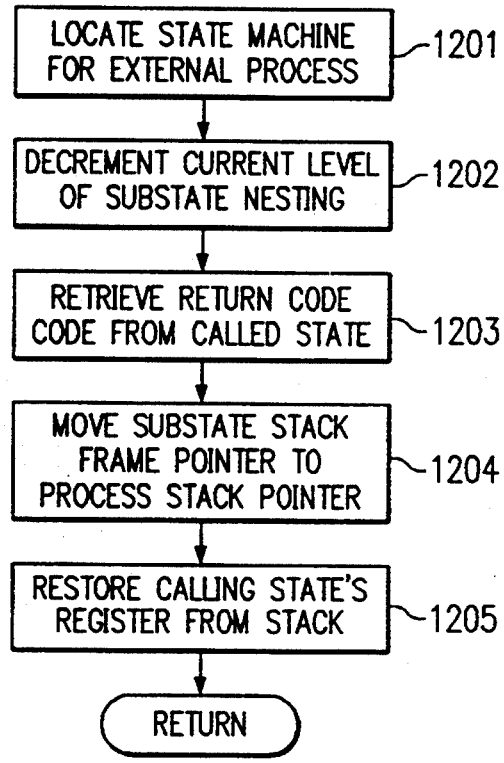

The procedure for performing a substate return is outlined in FIG. 12. It must also select the active state machine associated with the interrupting external process, 1201; must decrement the level of substate nesting specified in the state machine definition) must retrieve the substate return code to be returned to the calling state, 1203; must restore the stack pointer to the end of the permanent stack area for the calling state, indicated by the substate's stack frame pointer, 1204, and finally restore the calling state's registers and perform a procedure return to the calling state, 1205. It should be noted that this return information was actually pushed onto the stack, 1010 and 1011, upon entry into the substate call procedures, 1101 and 1106. It is taken often the stack by the substate return procedure in a manner resembling a normal procedure return. This stack manipulation is transparent to other procedures and is performed in a manner that does not restrict the request for a substate return to the base level procedure in the called state.

Figure 13:
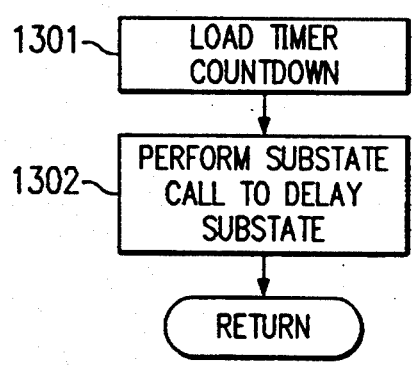
Figure 21:
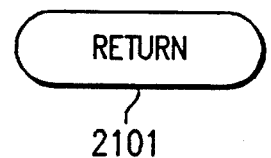

The implementation of a general purpose timed delay procedure is outlined in FIG. 13. This procedure loads the delay, 1301 and calls the delay timer substate, 1302.

The implementation of the delay timer substate is outlined in FIG. 14. The real work is done by the interval timer stimulus procedure, delay_timer. This procedure decrements the timer delay countdown, 1404, until the timer expires, 1405. Upon timer expiration, it performs a substate return, 1407.

This timed delay implementation should be compared to the traditional approach to interrupt handling outlined in FIG. 7.

We can summarize a simplified functional description of the plotter as a sequence of states depicted in FIG.

15. The stimuli driving transitions between states are represented by arrows connecting the states.

The plotter spends most of its time in the idle state, 1501 in which it checks on every timer interrupt for the arrival of new motion requests. The detection of an arrival upon a timer interrupt will send the plotter into the motion state, 1504. Upon entry the motion is initiated and the plotter remains in the state until completion of the motion. The occurrence of various errors sends the machine to the reset state, where a subsystem reset is initiated, 1503. Upon completion of the reset, a progression is made to the home state, 1502.

To illustrate the application to the plotter, the implementation of the reset state is summarized in FIGS. 16 through 21. FIG. 16 provides the reset state stimulus table definition.

The reset state entry procedure is described in FIG. 17. This procedure determines the current subsystem, 1701, clears the associated output port, 1702, clears the area of memory allocated for status information, 1703, issues the reset command to all of the controllers 1704, and sets up the reset timer countdown 1705.

In FIG. 18 the reset interval timer stimulus routine is presented. This routine is responsible for decrementing the reset timeout countdown, 1802, until expiry, 1803. Expiration of the timeout will restate the reset. Otherwise, the watchdog timer must be refreshed to prevent its expiration.

The procedure for handling errors during the reset is outlined in FIG. 19. This procedure simply re-enters the reset state to restart the reset.

The reset status monitor routine is a stimulus routine for the trajectory complete and breakpoint reached stimuli. It is descried in FIG. 20 and is responsible for detecting that the reset has completed, 2002 as indicated by the assertion of thee two stimulii. Upon completion of the reset, the servomotor controller will be configured for operation, 2003 and enabled, 2004. Once all motors have completed the reset and been enabled, 2005, a state progression to the home state will be performed.

A number of remarks concerning the reset state and comparison with an implementation that might have been done in the traditional manner are pertinent:

1) the processing for each interrupt is substantially reduced,
2) the processing for each interrupt is more sequential,
3) the processing for interrupts is notably more modular,
4) the processing of events is not intertwined with the details of interrupt handling,
5) the handling of unexpected events is well defined,
6) the implementation of states is notably modular, and
7) it is obviously much easier to implement new features in this scenario.

The state machine implementation has introduced the concept of an external process to justify its existence and has provided the attendant stack and memory management which would have been provided by the host operating system for a real process. The implementation is functionally complete, as demonstrated by the ease of implementation of general purpose timed delays.

Further, the implementation has been reduced to practice in a manner which makes it a highly attractive vehicle for the development of interrupt handlers. First, it is extremely modular. Second, because of the attention paid to stack management, it is extremely efficient. The interrupt handler described in FIG. 23 is implemented in about 75 machine instructions on the IBM PC. The state progression routine, next_state, is described in FIG. 22, as ten machine instructions. The substate call and substate return require about 30 instructions each to complete.

Although this description describes the invention with reference to the above specified embodiments, it is but one example, and the claims, not this description, limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. An interrupt system for controlling a plurality of individual processes, each such process controlled by a respective state machine, said system comprising:
   means for identifying a said process upon receipt of an interrupt;
   means for selecting for each identified process a memory and a plurality of resources;
   means for handling interrupts from said processes, said interrupt handling means including:
      means for accessing and utilizing said memory and said plurality of resources selected for each said process;
      means for accepting from any one process one or more of applied stimuli; and
      means for reallocating resources unused by said one process to other of said processes as a function of process priority.

2. The system set forth in claim 1 including means for nesting one or more states of said respective state machine of a selected one of said processes; and
   means for providing movement from a first state to any other state as a result of receipt of said stimuli.

3. The system set forth in claim 2 wherein said providing means includes means for generating a memory stack.

4. The system as set forth in claim 3 wherein said memory stack includes a permanent portion and a temporary portion;
   means for dynamically adjusting relative sizes of said portions; and
   means for marking a boundary between said portions.

5. The system set forth in claim 2 wherein said providing means also includes means for entering a quiescent state by said interrupt handling means.

6. The system set forth in claim 1 wherein said individual processes combine to control a servomotor system having a plurality of servo systems controlling individual servomotors, said system including monitoring of servo switches which monitor a position of said servomotors, and wherein each said servo system communicates to said interrupt handling means over a common interrupt stimuli bus, said bus communicating said applied stimuli as an interrupt request, said interrupt handling means including:
   means for polling each servosystem to determine a highest priority outstanding one of said interrupt requests;
   means controlled by said mapping accessing means for identifying a particular said interrupt request with a specific servo system and with a particular motor or group of motors; and means controlled by information contained in said memory and by information provided by said servoswitches for applying interrupt request stimuli to said servosystems for controlling said servomotors.

7. An interrupt handler for use in conjunction with a general purpose computer, said interrupt handler comprising:
   means for receiving interrupts from a plurality of independent processes external to said computer;
   means for invoking a plurality of defined routines under control of received ones of said interrupts, each said routine operative to provide control processing for one of said processes sending said received interrupts;
   means for selecting, for each of said processes, a memory stack used to store data for said invoked routines;
   means for concurrently, but independently, processing within said computer specific portions of said invoked routines; and
   means for reallocating processing resources unused by said specific portions to other specific portions as a function of task priority.

8. The system set forth in claim 7 further comprising:
   means controlled by said processing means for accessing said memory stack.

9. The system set forth in claim 8 wherein said memory stack has a permanent portion and a temporary portion;
   means for dynamically adjusting relative sizes of said portions; and
   means for marking a boundary between said portions.

10. The system set forth in claim 9 wherein said processing means includes said accessing means.

11. A method of handling interrupts in conjunction with a general purpose computer, said method comprising the steps of:
    receiving interrupts from a plurality of independent processes external to said computer;
    invoking a plurality of defined routines in response to received said ones of interrupts, each said routine operative to provide control processing for one of said processes sending said interrupts;
    storing data for said invoked routines in a memory stack assigned to each of said processes;
    concurrently, but independently, processing within said computer specific portions of invoked ones of said routines for each of a plurality of said processes; and
    reallocating processing resources unused by said specific portions to other specific portions as a function of priority.

12. The method set forth in claim 11 wherein said processing step includes the step of:
    accessing said memory stack.

13. The method as set forth in claim 12 wherein said memory stack includes a permanent portion and a temporary portion, and wherein said method further includes the steps of:
    dynamically adjusting relative sizes of said portions; and
    marking a boundary between said portions.

14. The method as set forth in claim 13 wherein said adjusting step includes the step of growing said memory stack downward and storing at said marked boundary an address of one of said routines.

15. A servocontrol system for use in conjunction with a general purpose computer, said servosystem including a plurality of independent but coordinated processes each having interrupts which are indicative of a need for processing by said computer, said system comprising:
    means for receiving said interrupts from a plurality of said processes;
    means for invoking a plurality of defined routines under control of received interrupts, each said routine operative to provide control processing for one of said processes sending one of said interrupts;
    means of selecting for each of said processes a memory stack used to store data for said invoked routines;
    means for concurrently, but independently, processing within said computer a plurality of invoked routines; and
    means for reallocating processing resources unused by said invoked routines to other routines as a function of routine priority.

16. The system set forth in claim 15 further comprising:
    means operable for accessing said memory stack, said accessing means under control of said processing means.

17. The system as set forth in claim 16 wherein said memory stack includes a permanent portion and a temporary portion;
    means for dynamically adjusting relative sizes of said portions; and
    means for marking a boundary between said portions.

18. The system as set forth in claim 17 wherein said adjusting means includes:
    means for growing said stack downward and for storing at said marked boundary an address of one of said routines.

19. The system set forth in claim 18 wherein said processing means includes said accessing means.

20. In a system for allocating processing resources to processing of an interrupting task, a system for controlling processing of multiple tasks, comprising:
    means for selecting a specific one of said tasks in response to a received interrupt; and
    means for reallocating processing resources unused by said interrupting task to other tasks as a function of task priority.

21. The system set forth in claim 20 further comprising means for allocating memory and resources for each one of said tasks.

22. The system set forth in claim 21 further comprising means for selecting one finite state machine from a set of independent and parallel finite state machines for each one of said tasks.

23. The system set forth in claim 21 further comprising means for maintaining for each said controlled process in said allocated memory information concerning a current state of the controlled process.

24. The system set forth in claim 23 wherein said tasks control a servomotor system.

* * * * *